United States Patent [19]

Eder

[11] Patent Number: 5,311,542
[45] Date of Patent: May 10, 1994

[54] SPREAD SPECTRUM COMMUNICATION SYSTEM

[75] Inventor: Kenneth C. Eder, Circle Pines

[73] Assignee: Honeywell Inc., Minneapolis, Minn.

[21] Appl. No.: 960,189

[22] Filed: Oct. 9, 1992

Related U.S. Application Data

[63] Continuation of Ser. No. 584,972, Sep. 19, 1990, abandoned.

[51] Int. Cl.⁵ .................................................. H04K 1/00
[52] U.S. Cl. ........................................... 375/1; 380/34
[58] Field of Search .................. 375/1, 62, 66, 89, 91; 380/34, 48; 370/120, 122; 455/59, 103, 112, 209, 216

[56] References Cited

U.S. PATENT DOCUMENTS

| | | | |
|---|---|---|---|
| 4,086,504 | 4/1978 | Ezell et al. | 375/1 |
| 4,328,554 | 5/1982 | Mantione | 364/721 |
| 4,442,527 | 4/1984 | Munday | 375/1 |
| 4,558,453 | 12/1985 | Mimken | 375/1 |
| 4,606,040 | 8/1986 | David et al. | 375/1 |
| 4,612,652 | 9/1986 | Kadin | 375/1 |
| 4,621,365 | 11/1986 | Chiu | 375/1 |
| 4,630,283 | 12/1986 | Schiff | 375/1 |
| 4,653,068 | 3/1987 | Kadin | 375/1 |
| 4,654,859 | 3/1987 | Kung et al. | 375/1 |
| 4,677,617 | 6/1987 | O'Connor et al. | 370/100 |
| 4,704,585 | 11/1987 | Lind | 331/14 |
| 4,752,939 | 6/1988 | Amoroso et al. | 375/1 |
| 4,759,034 | 7/1988 | Nagazumi | 375/1 |
| 4,774,715 | 9/1988 | Messenger | 375/1 |
| 4,807,248 | 2/1989 | Pyatt et al. | 375/1 |
| 4,837,823 | 6/1989 | Ham et al. | 380/34 |
| 4,850,036 | 7/1989 | Smith | 455/179 |
| 4,860,307 | 8/1989 | Nakayama | 375/1 |
| 4,868,523 | 9/1989 | Petersson | 331/14 |
| 4,875,221 | 10/1989 | Mori | 375/1 |
| 4,977,577 | 12/1990 | Arthur et al. | 375/1 |
| 5,130,987 | 7/1992 | Flammer | 375/1 X |

Primary Examiner—Tod R. Swann
Attorney, Agent, or Firm—Michael B. Atlass; Theodore F. Neils

[57] ABSTRACT

A spread spectrum communication system having a plurality of transmitters at remote locations capable of transmitting information to one or more receivers during a plurality of information time durations. A message structure interposing the plurality of information time durations with a plurality of preamble time durations, during which time the receiver detects message transmission, is also provided.

22 Claims, 8 Drawing Sheets

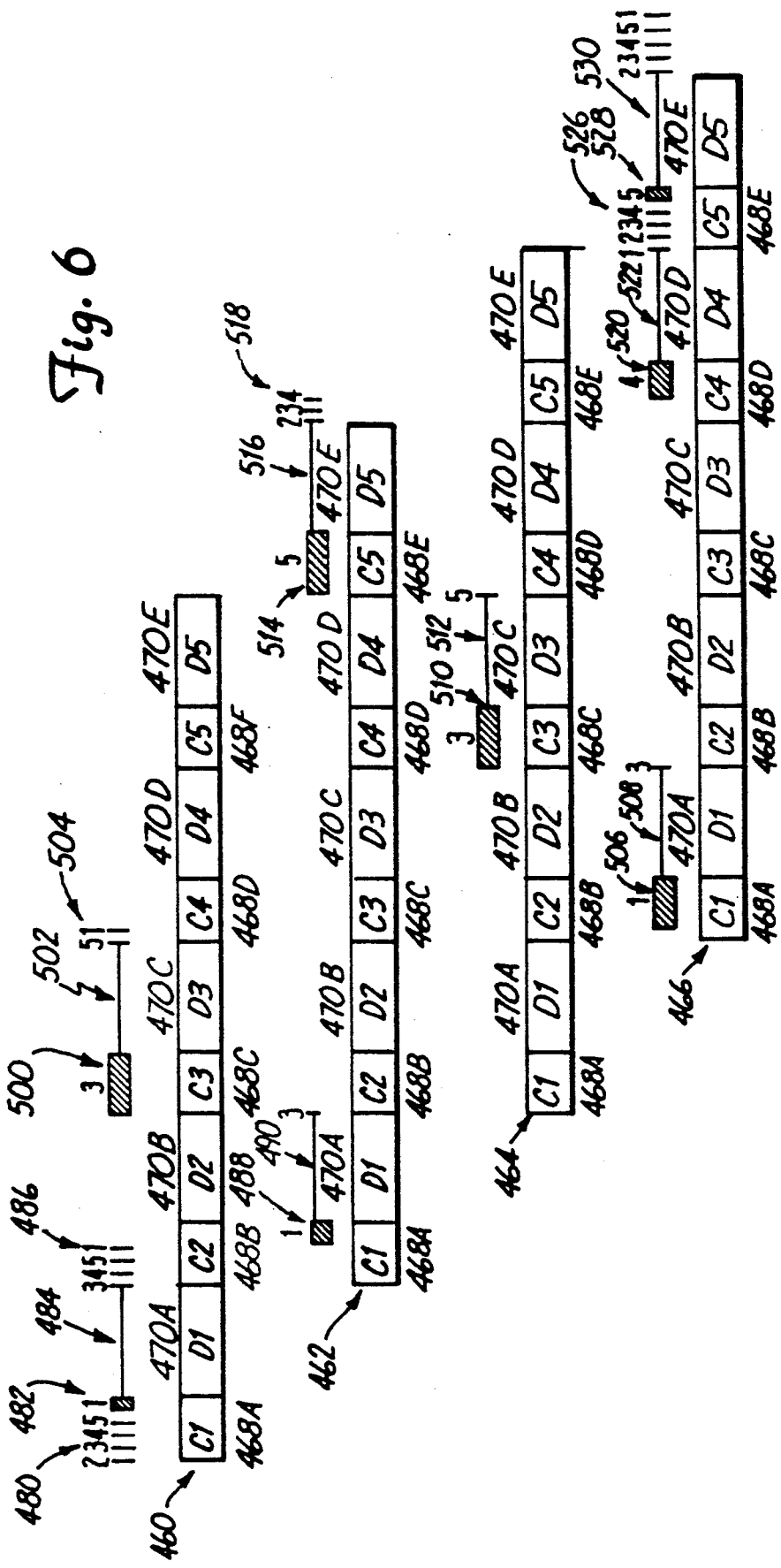

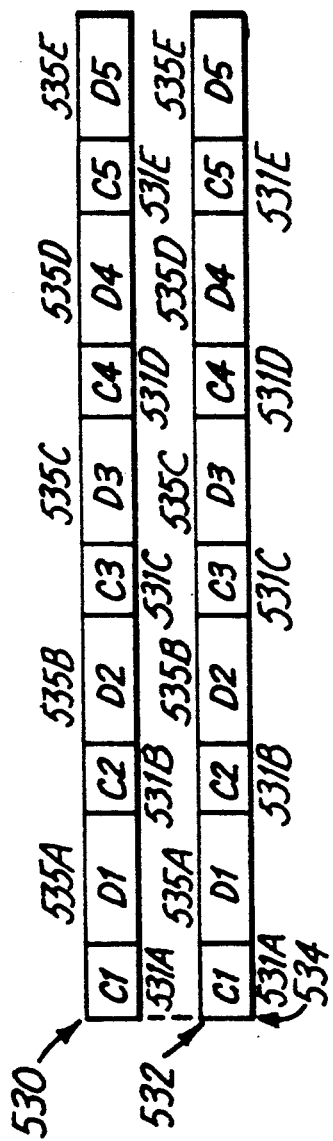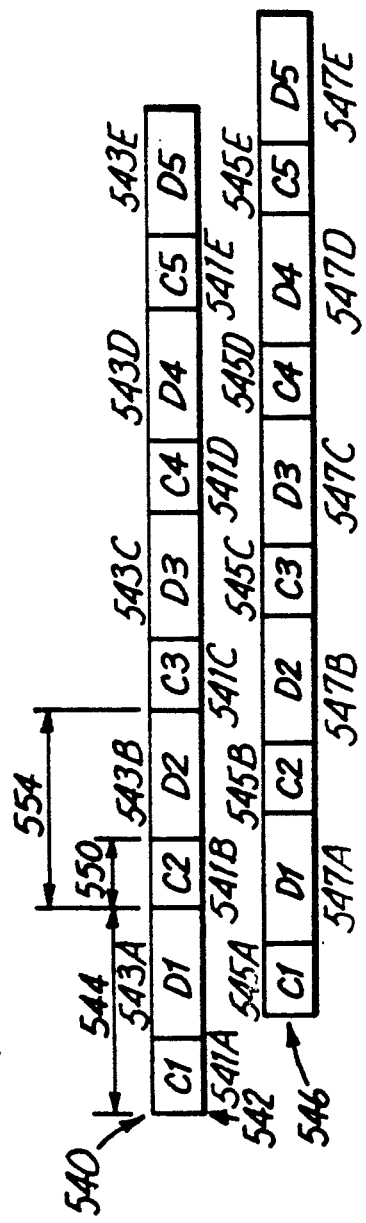

SPREAD SPECTRUM COMMUNICATION SYSTEM

This application is a continuation of application Ser. No. 07/584,972, filed Sep. 19, 1990 now abandoned.

BACKGROUND OF THE INVENTION

The present invention is related to spread spectrum communication systems and, more particularly, to spread spectrum communication systems having a plurality of transmitters at remote locations capable of transmitting information to one or more receivers.

The Federal Communications Commission provides for use of low-power communication devices under Part 15 of its rules with the purpose of permitting such use of these communication devices under less stringent requirements than are typically found in other Parts of its rules, such as permitting unlicensed operation, to reduce cost and to promote providing to the public the benefits that come with increased communication device use. That the Commission provides this opportunity follows in large part from the perceived reduced likelihood of interference by a user of such a device with other users of that and nearby portions of the electromagnetic spectrum because of the low values of radiated power permitted in the transmitting of electromagnetic radiation in the permitted frequency bands.

These rules have been recently amended to now permit the use of two kinds of spread spectrum systems thereunder, direct sequence systems and frequency hopping systems. Such spread spectrum systems reduce power density of the electromagnetic radiation transmitted thereby at any frequency or narrow band of frequencies within the total frequency bandwidth being used in such transmission which thus reduces the probability of that radiation interfering with other transmissions in the same total frequency bandwidth. Further, spread spectrum systems tend to be able to tolerate strong interference from other radiation in the total frequency bandwidth it is using without that interference causing disruption of the operation of such a system. These characteristics thus conform well to the purpose of the Part 15 rules and the Commission, as a result, has authorized relatively high output powers for such spread spectrum systems compared to the other low-power devices authorized under those rules.

One desirable use for such spread spectrum systems under the Part 15 rules is in the implementation of security systems. Typically, such a system will have a number of locations in which some change of condition from the normal situation is to be sensed, this sensing information being sent to a transmitter which in turn transmits that information to a central receiver, or receivers. Thus, the opening or closing of an access limiting means at an opening in a wall, such as a door or window, might be sensed, or the motion of a body in some monitored space or spaces might instead be sensed as a basis for securing a building or other facility against entry by intruders. Alternatively, changes in constituents of the atmosphere surrounding a sensor might be sensed such as the onset of smoke or other chemical change, or the temperature, or light levels, or the like, might instead be sensed. The information sensed, and perhaps other information provided in connection therewith by other sensing devices or some other means, is passed to the nearest transmitter or transmitters in the spread spectrum system for transmission to the desired receiver.

Difficulties in such transmissions between remotely located transmitters at various sensing stations in the field and the central receiver, or receivers, can easily arise. Often, such security systems are desired to operate in facilities of substantial value which usually implies that a number of structures or structural portions will often be present in the vicinity of the transmission path between such transmitters and the desired receiver or receivers. Reflection of the transmitted electromagnetic waves will result in increasing the number of alternative transmission, or radiation, paths between each of the transmitters and a receiver so that various portions of the electromagnetic waves reaching the receiver from a transmitter will have followed different paths. As a result, there can easily be cancellation at the receiver of the electromagnetic radiation transmitted by a transmitter at some frequencies.

Another problem which arises when the number of remotely located transmitters are able to transmit information over electromagnetic waves to a central receiver at any time is the possibility of two or more transmitters simultaneously transmitting, and thereby interfering with one another. Either of the foregoing problems could lead to preventing communication between a transmitter and the receiver or receivers. This is a serious difficulty since the reliability of communication between any one transmitter and a central receiver must be quite high in a security system if the user of this system is to be alerted quickly to any changes in the conditions being monitored by that system.

Another consideration, especially for the remotely located transmitters at various sensing stations, is minimization of the use of electrical power. Such transmitters will, in at least some circumstances, be required to operate on battery power because of the nature of the facilities occurring at the sensing station at which it is located.

Thus, there is desired a spread spectrum communication system which can operate in the presence of multiple alternative transmission paths between the transmitters used therein and a central receiver or receivers, and which can tolerate at least some overlapping of transmissions from two or more of its transmitters to a central receiver or receivers. Further, such a system must operate with its transmitters, and perhaps receiver or receivers, drawing sufficiently low power while operating within the rules set forth by the Federal Communications Commission for low-power communication devices under Part 15.

SUMMARY OF THE INVENTION

The present invention provides a communications system for transmitting and receiving selected information to at least one receiving location from at least one of a plurality of different remote transmitting locations. At each transmitting location a transmitter is provided. These transmitters are initiated by a corresponding initiating event and, upon initiation, are capable of transmitting electromagnetic radiation in a succession of time durations in each of which radiation frequencies are confined primarily in a range of frequencies that is relatively close to a corresponding one of a plurality of carrier frequencies. Each time duration in the succession of time duration comprises a plurality of preamble time durations each separated from its succeeding one by a corresponding one of a plurality of information time durations provided from a multiplicity of the plurality of information time durations. During each preamble time duration a carrier signal having one of the plurality of carrier frequencies is separately modulated in a transmitter by an acquisition signal followed by modulation by a data signal of another carrier signal having another frequency from said plurality of carrier frequencies for each information time duration in the following plurality of information time durations.

At least at one receiving location a receiver is provided. This receiver is capable of receiving electromagnetic radiation transmitted by the transmitters during any corresponding preamble time durations of each and of scanning though those carrier frequencies used in such preamble time durations to detect and recover from such received radiation at least part of the acquisition signal. Upon recovery of the acquisition signal, and thus recognition by the receiver that the transmitted radiated electromagnetic radiation appears to be from one of the transmitters, the receiver then, during the corresponding plurality of information time durations immediately following such a preamble time duration, demodulates and recovers, from the carrier signals used during that plurality of information time durations, at least part of the data signal transmitted by the corresponding transmitter.

BRIEF DESCRIPTION OF THE DRAWINGS

FIG. 6 shows a plurality of messages with the format of FIG. 1, FIG. 7 shows a plurality of messages with the format of FIG. 1, FIG. 8 shows a plurality of messages with the format of FIG. 1.

DETAILED DESCRIPTION OF THE PREFERRED EMBODIMENTS

Figure 1:
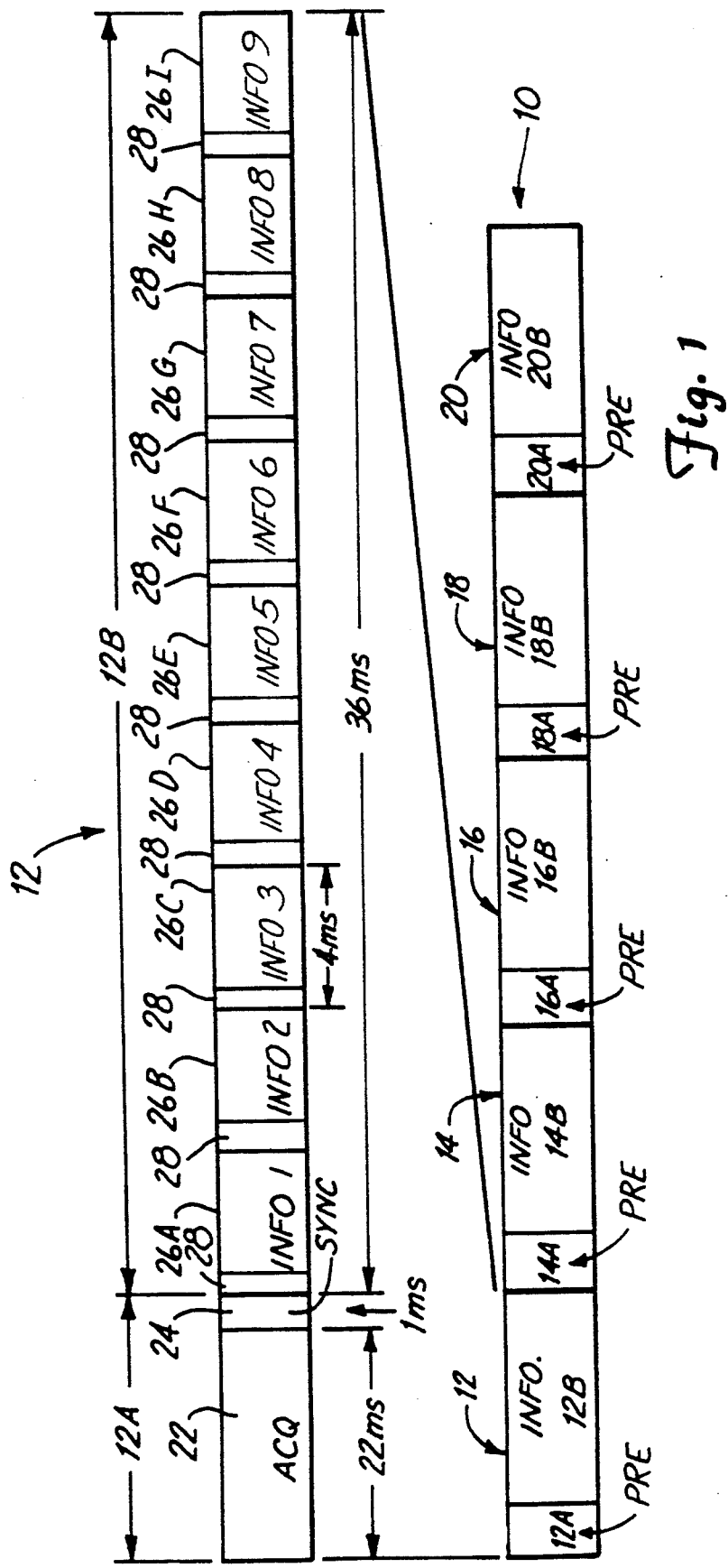
FIG. 1 shows a message format diagram used in the present invention.

Referring to FIG. 1, a format diagram, 10, for transmission of messages used in the present invention is shown. Message format diagram 10 is used in transmissions initiated by an initiating event from a transmitter at a transmitting location, described below, to at least one receiver at a receiving location, also described below. A spread spectrum communications arrangement based on frequency hopping is utilized in implementing the format shown by message format diagram 10 in transmitting the information contained therein. The information to be transmitted in the format of message format diagram 10 is transmitted through modulation of not just one single carrier signal, but is rather repeatedly transmitted through modulation of a predetermined sequence of carrier signals.

An easier understanding of the present invention follows from first describing the structure of message format diagram 10. A transmitter, capable of transmitting a message in the format of message format diagram 10 through modulating a sequence of carrier signals, and a receiver, capable of synchronizing its frequency reception to these transmitted modulated carrier signals will then be described in greater detail.

Referring to FIG. 1, message format diagram 10 is shown comprising five successive segments in time, 12, 14, 16, 18, and 20. Each segment has a time duration portion for transmitting a preamble signal, 12A, 14A, 16A, 18A, and 20A, and a time duration portion for transmitting information signals in each, 12B, 14B, 16B, 18B, and 20B, the latter durations having nine subdivisions, not shown. In other words, signals following the structure of segmented message format diagram 10 are transmitted with the following sequentially ordered structure: a first preamble time duration 12A; a first information time duration 12B having nine subdivisions therein; a second preamble time duration 14A; a second information time duration 14B having nine subdivisions therein; a third preamble time duration 16A; a third information time duration 16B having nine subdivisions therein; a fourth preamble time duration 18A; a fourth information time duration 18B having nine subdivisions therein; a fifth preamble time duration 20A; and a fifth information time duration 20B having nine subdivisions therein. The preamble time durations 12A, 14A, 16A, 18A, and 20A are identical in duration, and all the pluralities of information time durations 12B, 14B, 16B, 18B, and 20B are identical in duration as are each of the subdivisions therein.

Above message format diagram 10, the portion of that diagram representing the first preamble time duration 12A and the first information time duration 12B of the first time segment 12 are expanded. As shown in that expanded portion of message format diagram 10, preamble time duration 12A further comprises two additional time durations, an acquisition time duration, 22, and a synchronization time duration, 24. The other preamble time durations, 14A, 16A, 18A, and 20A, are similarly subdivided. When the transmitter is activated from intruder sensors, smoke detectors or other initiating devices, a receiver acquisition process initiation transmission, or call, is made to the receiver by that transmitter during each of the preamble time durations 12A, 14A, 16A, 18A, and 20A. Each such call comprises modulation of a call carrier sinusoidal signal by an acquisition signal during acquisition time duration 22 immediately followed by modulation of the same call carrier signal by a synchronizing signal during synchronization time duration 24. A different call carrier signal is used during each preamble time duration 12A, 14A, 16A, 18A, and 20A. Each call carrier signal has a frequency within the frequency range of 902 to 928 MHz permitted under FCC rules.

Compared to the call carrier signal frequency, the acquisition signal frequency modulating it has a value that is small. The acquisition signal frequency equals 2.5 kHz. The total time duration for the modulation of each call carrier signal by the acquisition signal is 22.0 ms, i.e. the call carrier signal is modulated by the acquisition signal for 55 cycles of its 2.5 kHz square wave signal waveform. The acquisition signal is a two-value digital signal that modulates the call carrier signal by frequency shift keying.

After modulation of the call carrier for signal by the 2.5 kHz acquisition signal for 55 cycles thereof, the transmitter modulates the same call carrier signal by the synchronizing signal during synchronization time duration 24. Modulation of the call carrier signal by the synchronization signal is accomplished again through frequency shift keying and, like the acquisition signal, the synchronization signal is a two-valued digital signal. The frequency of the synchronizing signal is 4.0 kHz which is small compared to that of the call carrier signals used in each preamble time duration. The 4.0 kHz synchronizing signal modulates each call carrier signal for four cycles of the 4.0 kHz synchronization signal, that is, for a duration of 1.0 ms. After the synchronizing signal has finished modulating the call carrier signal, a predetermined sinusoidal carrier signal sequence begins based on different signal frequencies.

The expanded portion of message format diagram 10 representing the first segment in time 12 further shows nine subdivisions, or information time durations, 26A through 26I, comprising the first information time duration 12B. The first information time duration 26A and each succeeding information time duration thereafter, 26B through 26I, lasts for 4.0 ms. During each, a sinusoidal data carrier signal (of a different frequency in each) is modulated by a data signal comprising 20 bits of data, the frequency of each also differing from the call carrier signal frequency. Like the call carrier signals used for each preamble time duration described above, the data carrier signals used for each information time duration 26A through 26I are within the frequency range of 902.0 to 928.0 MHz, and modulation of the data carrier signal is accomplished through frequency shift keying. Modulation is at 4.0 kHz, thereby realizing a data transmission rate of eight kilobits per second. Although 32 bits could be transmitted during each 4.0 ms information time duration, a 1.5 ms delay, 28, is included in each information time duration 26A through 26I to insure data carrier signal stabilization before modulation thereof by the data signal.

After data transmission during the first information time duration 26A, the transmitter changes the frequency value of the data carrier signal for time duration 26B and modulates this new data carrier frequency signal by the same data signal used during information time duration 26A before proceeding to the next information time duration 26C and the next data carrier signal frequency. The aforementioned data carrier signal frequency value changes repeatedly for each remaining information time 26D through 26I. Having completed transmission of segment 12 of message format diagram 10, the transmitter then transmits the same information again in segments 14, 16, 18 and 20 in a manner similar to that used in segment 12 described above. A transmitter and receiver capable of transmitting and receiving information in the format of message format diagram 10 will now be described.

Figure 2:
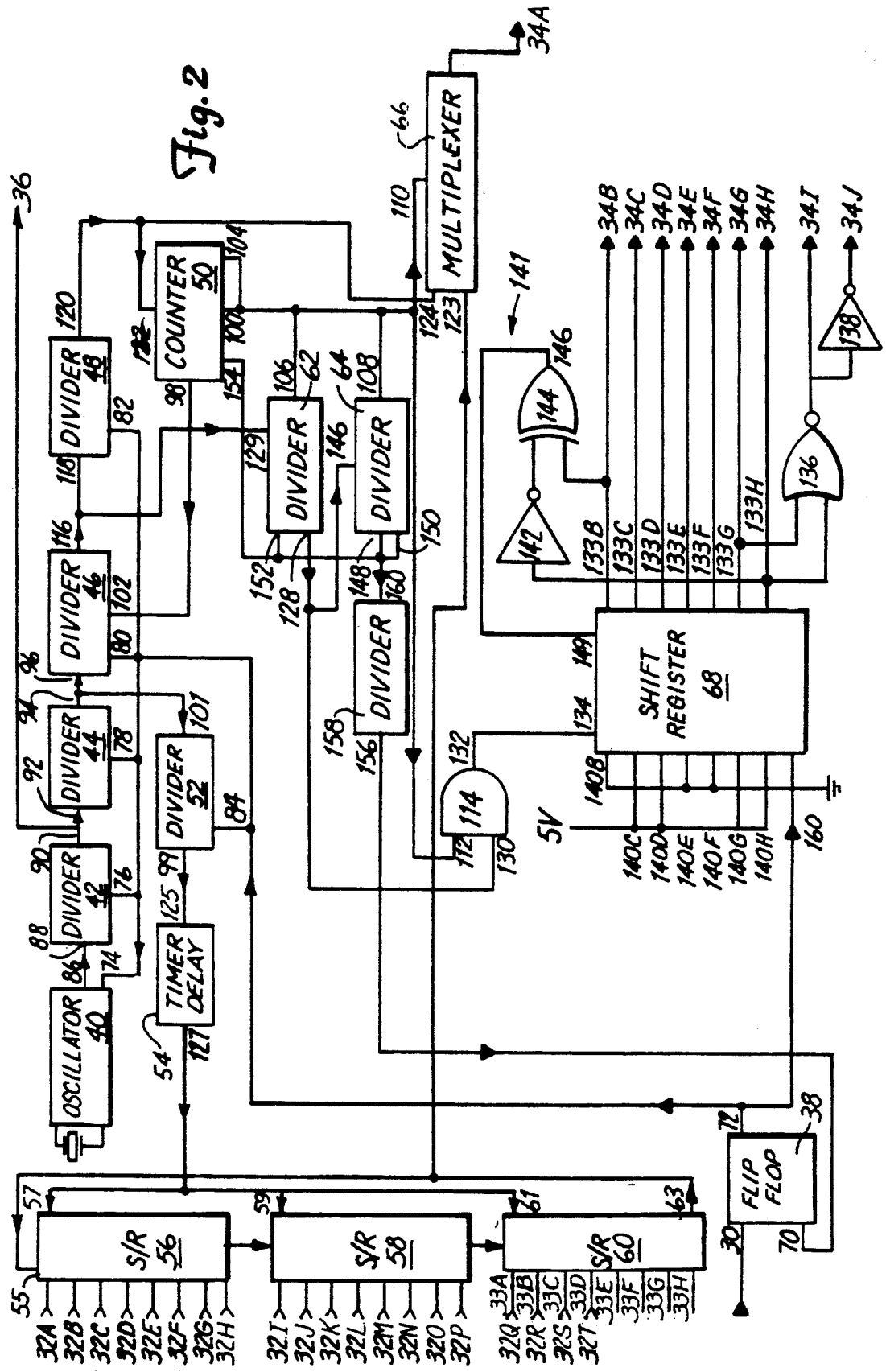
FIG. 2 shows a mixed block and digital diagram of a transmitter encoder embodying a portion of the present invention.
Figure 3:
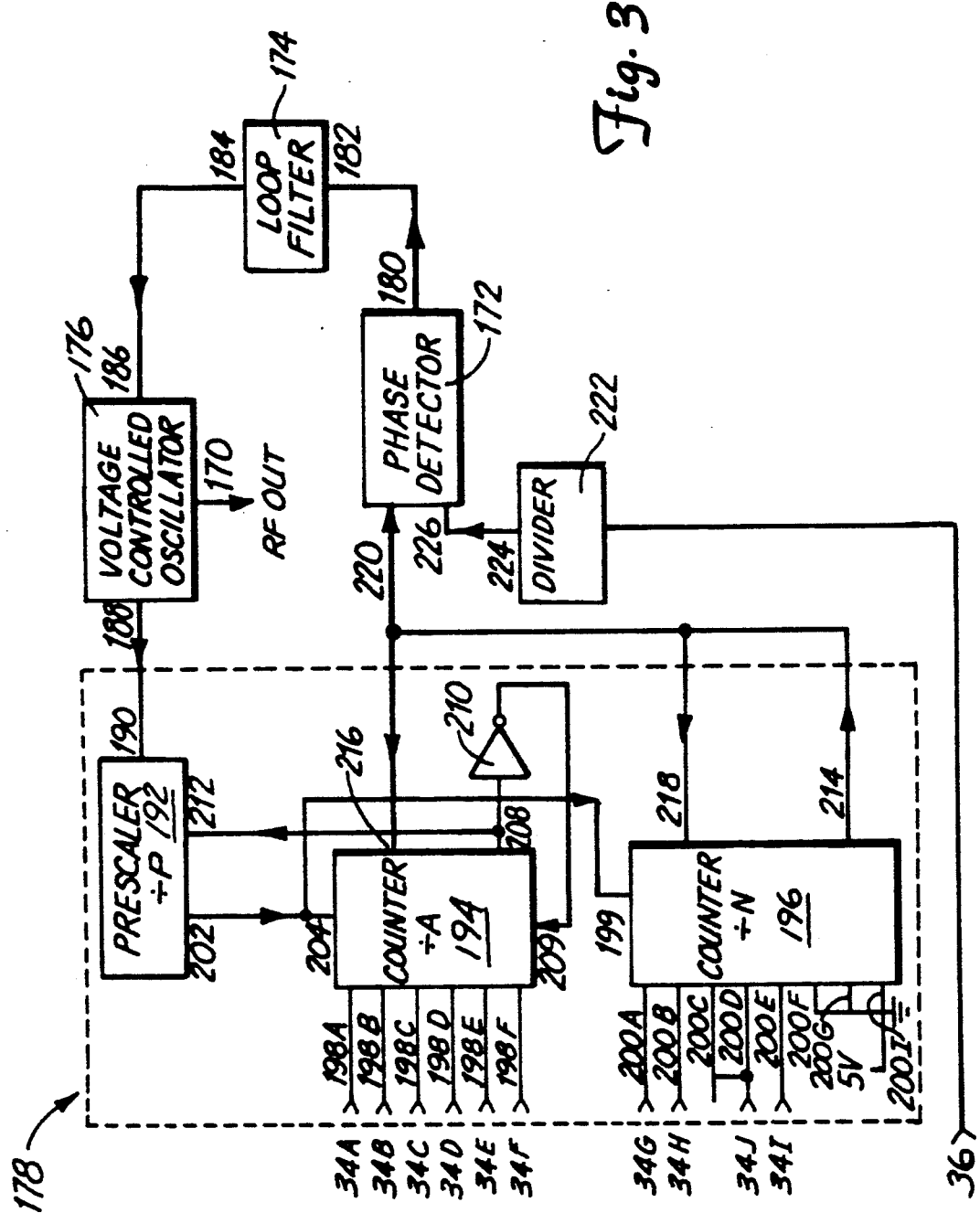
FIG. 3 shows a mixed block and digital diagram of a transmitter frequency synthesizer embodying a portion of the present invention.

Referring to FIGS. 2 and 3, a transmitter is shown in mixed block and digital logic diagrams. Specifically, the transmitter comprises a transmitter encoder circuit shown in FIG. 2, and a transmitter frequency synthesizer circuit shown in FIG. 3. The transmitter encoder has an initializing input, 30, and a data signal input comprising 20 digital inputs, 32A through 32T. The data signals present at inputs 32A through 32T, and the internally generated 2.5 kHz acquisition signals and 4.0 kHz synchronization signals referenced above, are each used to correspondingly and separately modulate carrier signals each of a different frequency generated by the transmitter frequency synthesizer shown in FIG. 3. All modulated output carrier signals are obtained at transmitter output, 170, shown in FIG. 3, while interconnections between the transmitter encoder and the transmitter frequency synthesizer are made through data lines, 34A through 34J, and through a reference clock signal line, 36.

Throughout the description of the transmitter circuit of FIGS. 2 and 3, and of a receiver circuit to follow, there will be references to inputs and outputs having digital signal values represented with the conventional Boolean algebra values of "1" and "0". Since all the diagrams described are combination block and digital diagrams, electrical circuit implementation of the systems in these diagrams can be by electrical circuits using actual voltage levels representing either positive or negative logic.

Referring back to FIG. 2, the transmitter encoder comprises: an initiating flip-flop, 38; a 4.0 MHz oscillator, 40, with associated dividers, 42, 44, with outputs therefrom providing clock signals; an acquisition and synchronization signal generator comprising two-stage divider, 46, divider, 48, and counter 50; and a data signal controller comprising divider, 52, timer delay, 54, and shift registers, 56, 58, and 60, with divider 52 receiving one of the clock signals; a hop signal generator comprising dividers, 62, and 64; and a multiplexer, 66, which controls modulation of the carrier signals by the acquisition, synchronization and data signals. Interconnection and operation of these components are described below.

As stated earlier, input 30 of flip-flop 38, initiates the transmitter of FIGS. 2 and 3. Flip-flop 38, an RS flip-flop, has two inputs, an "S", or "Set", input, 30, and an "R", or "Reset", input, 70, and one output, 72. Upon keying of the transmitter with a digital logic "1" at input 30, output 72 is set to a digital logic "0" which resets oscillator 40 and several of the dividers to synchronize them. Input 70 of RS flip-flop 38 receives a signal indicating complete transmission of all information contained in a transmission having the form of message format diagram 10, shown in FIG. 1, and will be described later.

Output 72 is connected to a reset input, 74, of oscillator 40 and reset inputs, 76, 78, 80, 82, and 84, of dividers 42, 44, 46, 48, and 52, respectively. A "0" at output 72 resets oscillator 40, to a definite phase, thereby producing a 4.0 MHz square wave clock signal at oscillator output, 86, with a known phase. Output 86 is connected to an input, 88, of divider 42 which has a divide ratio equal to ten. Divider 42 reduces the 4.0 MHz square wave clock signal to a 400.0 kHz square wave signal at output, 90, with fixed phase relationship to the clock signal. As shown in FIG. 2, output 90 is connected to an input, 92, of divider 44 having a divide ratio equal to five, resulting in an output square wave signal having a frequency of 80.0 kHz at its output, 94, with a fixed phase relationship with the 4.0 MHz clock signal. Output 94 is connected to an input, 96, of two-stage divider 46 and an input, 101, of divider 52.

Two-stage divider 46, divider 48, and counter 50 generate the acquisition signal and synchronization signal used in each preamble time durations 12A, 14A, 16A, 18A, and 20A which occur in message format diagram 10 described above. Counter 50 has two outputs, 98, and 100. Output 98 is connected back to two-stage divider 46 at a further input thereof, 102, with a logic signal having a value of "1" appearing on output 98 when counter 50 has been incremented at an input thereof, 122, to a count of 55. Signals on output 100 of counter 50 enable and disable that counter at its enabling input, 104, to reset its count to zero to permit it to count increments again to 55. These signals also reset dividers 62 and 64, and multiplexer 66 at enabling inputs, 106, 108, and 110, thereof, respectively. Output 100 is also connected to an input, 112, of an AND gate, 114. The logic signals on output 100 equal "1" when counter 50 has been incremented sufficiently to have reached a count of 59.

Generation of a 2.5 kHz acquisition signal and a 4.0 kHz synchronization signal occurs as follows. In its initial state, two-stage divider 46 is first set to divide by 16. Since input 96 thereof has an input clock signal of 80.0 kHz an, output, 116, thereof has an output frequency of 5.0 kHz. Output 116 is connected to an input, 118, of divider 48 which has a divide ratio of two, and therein is further reduced to 2.5 kHz at an output, 120, of that divider. The output signal on output 120 serves as a counting base signal to counter 50 at input 122 thereof based on the original clocking signal, and as the acquisition signal provided on an input, 124, of multiplexer 66. Since counter 50 has not incremented to a count of 59 for an output value of "1" on output 100 thereof when the clock signal of 2.5 kHz is first applied to input 122, the signal on output 100 remains at "0" which is supplied to an input, 110, of multiplexer 66 resulting in multiplexer 66 selecting the 2.5 kHz acquisition signal to appear on data line 34A.

The 2.5 kHz acquisition signal remains on data line 34A and at input 122 until counter 50 is incremented to a count of 55 and provides a "1" logic value at output 98 thereof. A "1" at output 98 signifies that 55 cycles of the 2.5 kHz acquisition signal have been provided for modulating the first call carrier signal in the transmitter frequency synthesizer in FIG. 3, and at this point two-stage divider 46 is set to its second stage divide ratio of ten through supplying the "1" on counter output 98 to input 102. With input 96 of divider 46 providing a square wave output signal with a frequency of 80.0 kHz, two-stage divider 46 now provides at its output 116 an 8.0 kHz square wave signal that is further reduced by divider 48 to 4.0 kHz square wave signal at output 120 of divider 48.

This 4.0 kHz signal is the synchronization signal and, like the acquisition signal, it is applied to input 122 of counter 50 and input 124 of multiplexer 66. Since counter 50 has incremented only to a count of 55, the signal value on output 100 thereof is a "0" which causes multiplexer 66 to select the 4.0 kHz synchronization signal present at input 124 to appear on data line 34A. The 4.0 kHz synchronization signal remains on data line 34A for a duration of four cycles or until counter 50 has incremented to a count of 59 which causes output 100 thereof to have a value of "1". Since output 100 is connected to input 104 thereof, input 110 of multiplexer 66, and inputs 106 and 108 of dividers 62 and 64, a value of "1" at these inputs causes counter 50 to be disabled and multiplexer 66, dividers 62 and 64 to be enabled.

With multiplexer 66 enabled, an input, 123, thereof is selected which allows the data signal present at inputs 32A through 32T to be clocked through multiplexer 66 to appear on data line 34A. The data signal transmission rate is controlled by divider 52. Divider 52 has a divide ratio of ten and an input square wave signal frequency of 80.0 kHz at input 101 thereof which realizes a square wave output signal of 8.0 kHz at an output, 99. Output 99 is connected to an input, 125, of eight-bit delay timer 54. An output signal from an output, 127, thereof provides a square wave clock signal for shift registers 56, 58, and 60 at inputs, 57, 59, and 61, thereof respectively. A square wave output signal from an output, 63, of shift register 60 comprising the data signal is applied to input 123 of multiplexer 66 and an input, 55, of shift register 56. Shift registers 56, 58 and 60, are all eight-bit shift registers, but, as shown in FIG. 2, only four inputs, 33A through 33D, are used on shift register 60. The remaining inputs, 33E through 33H, are unused. Since no signals are applied to inputs 33E through 33H, these inputs provide a four-bit delay. Combined with the initial eight-bit delay from delay timer 54, this four-bit delay provides a 12-bit or 1.5 ms delay to insure data carrier signal stabilization before the data carrier signal is modulated by the data signal.

Divider 62, AND gate 114 and a shift register, 68, are used to generate the nine data carrier signals used in each information time duration 12B, 14B, 16B, 18B, and 20B (having a duration of 4.0 ms and) following the format of message format diagram 10 shown in FIG. 1. Divider 62 has a divide ratio of 32, a square wave clock signal at an input, 129, equal to 8.0 kHz, and an output 128. With divider 62 enabled from a "1" at input 106, a "1" appears at output 128 thereof and subsequently, therefore, at an input, 130, of AND gate 114. Since inputs 112 and 130 of AND gate 114 both are a "1", a "1" is provided at an output, 132, of AND gate 114 which provides a "1" at an input, 134, of shift register 68. The "1" appearing at input 134 is a square wave clock signal having a frequency of 250 Hz or a time period of 4 ms. These 4 ms time periods correlate to the nine 4.0 ms information durations comprising each information time duration 12B, 14B, 16B, 18B, and 20B following the format of message format diagram 10 shown in FIG. 1.

Shift register 68 provides binary coded signals on data lines 34B through 34J indicative of the 50 different carrier signals used in the five call carrier signals and the 45 data carrier signals. Each individual call or data carrier signal has a unique binary code as defined by the combined individual digital logic values appearing on data lines 34B through 34J. The digital logic values appearing on data lines 34B through 34H coincide with digital logic values on shift register 68 outputs, 133B through 133H, whereas the digital logic value on data line 34I is obtained from the addition of digital logic values on data lines 34G and 34H though a NOR gate, 136. The digital logic value on data line 34I is inverted through an inverter, 138, to obtain the digital logic value for data line 34J. The combined digital values on data lines 34A through 34J serves as an input binary code to the transmitter frequency synthesizer circuit shown in FIG. 3. The unique binary code for the first call carrier signal is loaded into shift register 68 at inputs, 140B through 140H.

With each clock cycle or pulse at input 134 of shift register 68, digital logic values on outputs 133B through 133G are shifted toward output 133H. For example a digital logic "1" appearing at output 133B will appear on output 133C after one clock pulse and, after the next clock pulse, will appear on output 133D. A digital feedback circuit, 141, comprising an inverter, 142, and an XOR gate, 144, has an output, 146, that is connected to an input, 149, of shift register 68. The digital logic value appearing at input 149 of shift register 68 is shifted to appear on output 133B with each clock pulse applied to input 134 thereof. As shown in FIG. 2, the digital logic value appearing at output 146 is equal to the XOR addition of the digital logic value appearing at output 133B with the complement of the digital logic value at output 133H. Feedback circuit 141 and shift register 68 provide a repeatable sequence of unique binary data codes on data lines 34B through 34J indicative of the five call carrier signals and the 45 data carrier signals.

As stated above, a 250 Hz clock signal is obtained at output 128 of divider 62 which in turn is applied to input 130 of AND gate 144 which clocks shift register 68 at input 134. However as also shown in FIG. 2, output 128 is further connected to divider 64 at an input, 146. Divider 64, having a divide ratio of nine, in effect counts the number of data carrier signals generated since the last call carrier signal. When nine clock cycles or pulses have been received at input 146, divider 64 provides a digital logic "1" at an output, 148, which in turn is used to reset divider 64, divider 62 and counter 50 at inputs 150, 152, and 154, thereof respectively. With counter 50 reset, both outputs 98 and 100 thereof are equal to "0" whereby a "0" on output 98 resets two-stage divider 46, through input 102 thereof, to its first stage division ratio of 16, and a "0" on output 100 enables counter 50 through input 104, disables divider 62 through input 106 and disables divider 64 through input 108. With two-stage divider 46 set to divide by 16 and counter 50 reset, all information present in time segment 12 of message format diagram 10, shown in FIG. 1, has been transmitted. The acquisition, synchronization, and data signal modulation sequence, all described above, is then repeated for carrier signals used in remaining time segments 14, 16, 18 and 20. In total, 50 unique carrier signals are used before the message having the format of message format diagram 10 is completely transmitted.

Complete message transmission is signified by a value of "1 appearing on an output, 156, of a divider, 158. Divider 158 has a divide ratio equal to five, and an input, 160, connected to output 148 of divider 64. As described above, a "1" on output 148 signifies that data carrier signal modulation is complete for the last data carrier signal of each time segment 12, 14, 16, 18, and 20 of message format diagram 10 shown in FIG. 1. Therefore, upon complete transmission of the last or fifth time segment portion 20, a digital logic "i" is provided at output 156 of divider 158. Since output 156 is connected to reset input 70 of flip-flop 38, flip-flop 38 is reset with a digital logic "1" provided at output 72 thereof. A "1" at output 72 disables oscillator 40 at input 74, resets dividers 42, 44, 46, 48, and 52, at inputs 76, 78, 80, 82, and 84 thereof, respectively, and loads shift register 68, at an input, 160, with the binary code representative of the first call carrier signal applied to input lines 140B through 140H.

Referring to FIG. 3, the 50 modulated carrier signals are generated through the transmitter frequency synthesizer therein shown. The transmitter frequency synthesizer is a digital phase lock loop comprising a phase detector, 172, a loop filter, 174, a voltage controlled oscillator, 176, and a controllable divider, generally shown at 178. As stated earlier, inputs to the transmitter frequency synthesizer are on data lines 34A through 34I, and the reference clock signal 36.

Beginning with an output, 180, of phase detector 172, phase detector 172 is connected to loop filter 174 at an input, 182. An output, 184, of loop filter 174 is connected to an input, 186, of the voltage controlled oscillator 176. Two outputs, 170 and 188, are obtained from voltage controlled oscillator 176. A signal at output 170 is the transmitter output signal, whereas a signal at output 188 provides feedback for the transmitter frequency synthesizer at an input, 190, of divider 178.

Controllable divider 178 comprises a two-stage prescaler, 192 ("P"), and programmable dividers or counters, 194 ("A"), and 196 ("N"). Data lines 34A through 34F are connected to "A" counter 194 at inputs, 198A through 198F, whereas data lines 34G through 34I, are connected to "N" counter 196 at inputs, 200A through 200E. Additional inputs, 200F and 200G, of the "N" counter 196 always have a value of "0", whereas input, 200I, always has a value "1". The preamble acquisition and synchronizing signals, as well as data signals present on data line 34A, are applied to the least significant bit of the "A" counter 194 at input 198A.

The modulated carrier signals appear at outputs 170 and 188 of voltage controlled oscillator 176 as follows. Two-stage prescaler 192 first divides the square wave voltage controlled oscillator output signal appearing at input 190 by "P+1" or 65 to provide a square wave clock signal at an output, 202. Output 202 is connected to "A" counter 194 at an input, 204. This clock signal is applied to input 204 until the "A" counter 194 has decremented to its zero state at which point an output, 208, of "A" counter 194 then has a value of "1" which after being inverted to a value of "0" through an inverter, 210, disables "A" counter 194 at an input, 209. Output 208 of "A" counter 194 is also connected to an input, 212, of prescaler 192. The "1" at output 208 sets prescaler 192 to its second stage divide ratio of 64 through an input, 212. Division by 64 equals the "P" state of prescaler 192. Since output 202 of prescaler 192 is also connected to an input, 199, of "P" counter 194, prescaler 192 provides a clock signal to "N" counter 196 at input 199 until "N" counter 196 has decremented to its zero state which is signified by a "1" appearing at an output, 214, thereof. This digital logic "1" signal is applied to an input, 216, on "A" counter 144 and an input, 218, on "N" counter 196 which initiates loading of the binary code representative of the next carrier signal on data lines 34A through 34I. Furthermore, this digital logic "1" signal is a square wave signal with a frequency equivalent to the voltage controlled oscillator output signals appearing at outputs 170 and 188 divided by (N×P)+A.

The square wave signal on output 214 is applied to phase detector 172 at an input, 220, which is compared to a reference signal applied to an input, 226. The reference signal is derived from clock signal 36 through a reference divider, 222. The square wave signal appearing at carrier output 170 of voltage controlled oscillator 176 is adjusted through the loop filter 174 to produce equality at inputs 220 and 226 of phase detector 172.

Figure 4A:
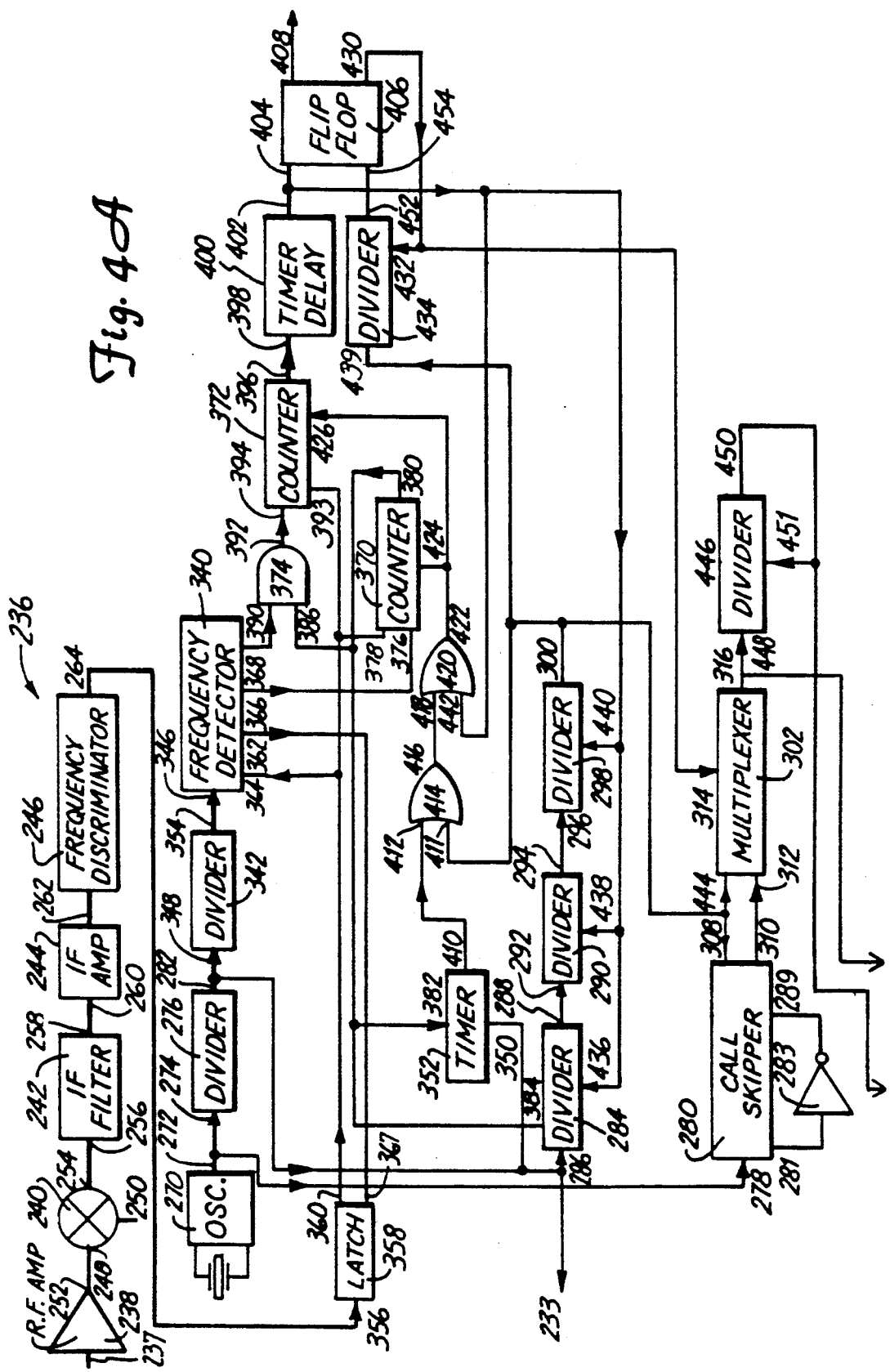
FIG. 4A shows a portion of a mixed block and digital diagram of a receiver decoder embodying a portion of the present invention.
Figure 4B:
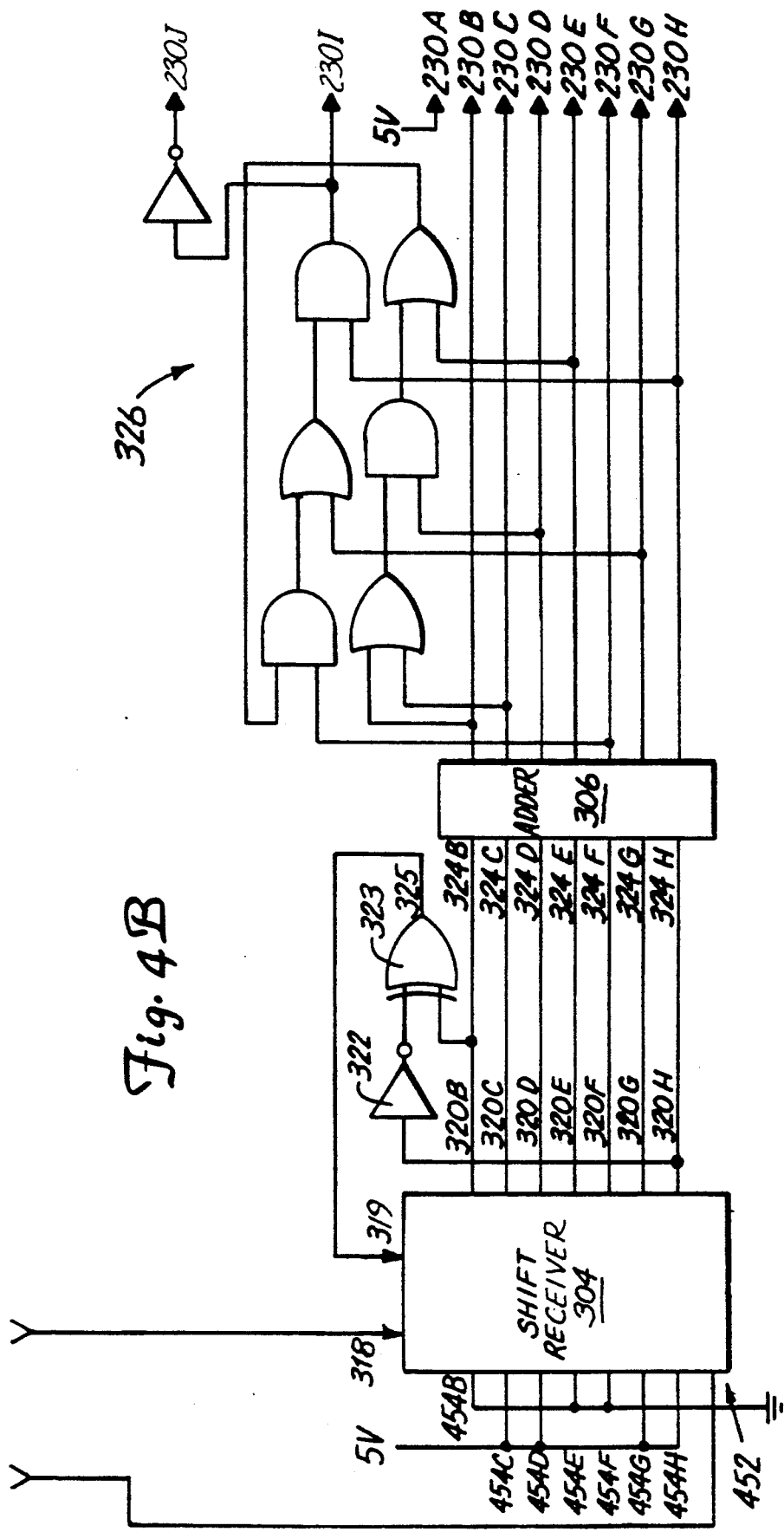
FIG. 4B shows a portion of a mixed block and digital diagram of a receiver decoder embodying a portion of the present invention.
Figure 5:
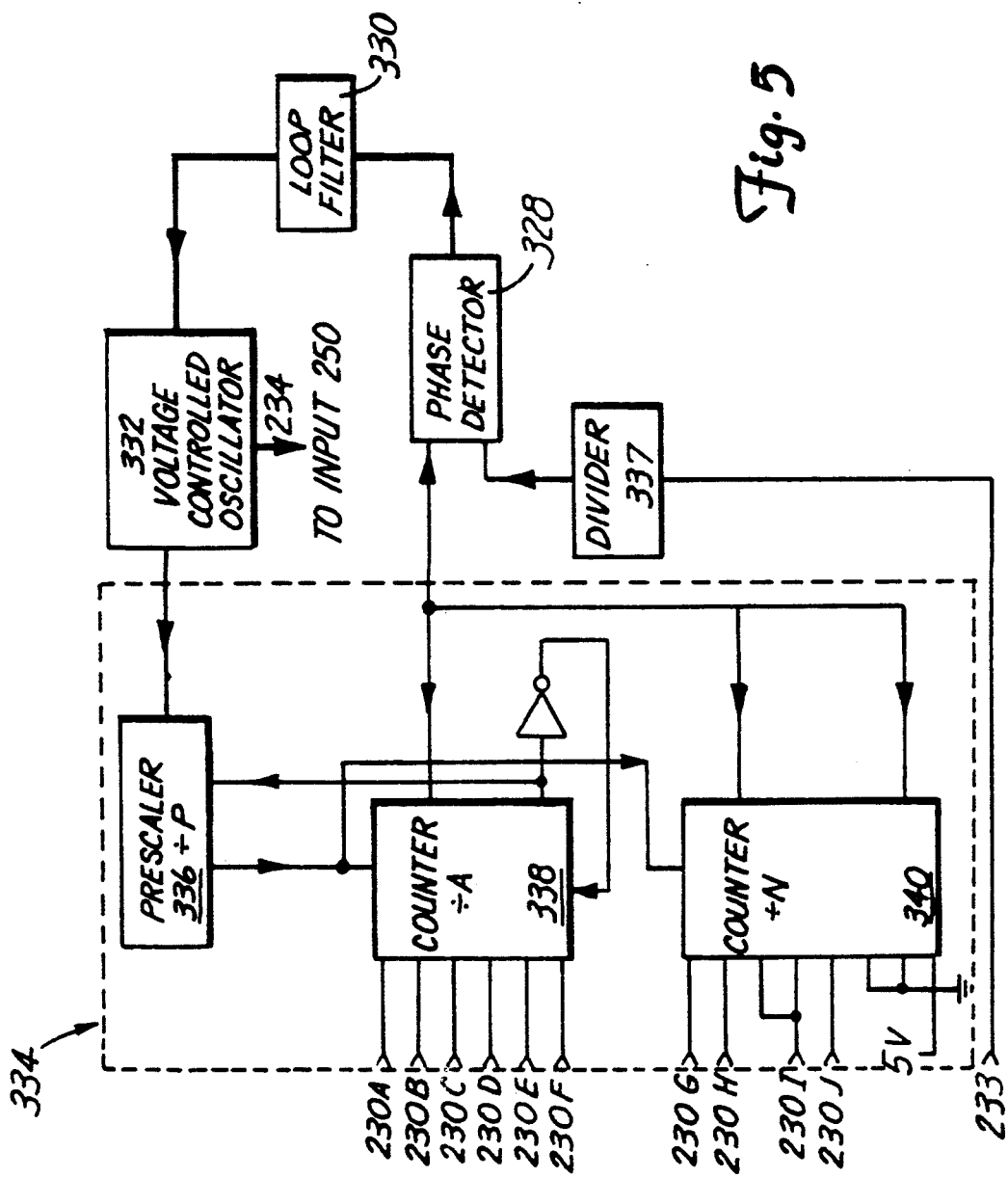
FIG. 5 shows a mixed block and digital diagram of a receiver frequency synthesizer embodying a portion of the present invention.

Referring to FIGS. 4A, 4B and 5, a receiver capable of synchronizing to the transmitter of FIGS. 2 and 3 is shown. Like the transmitter described above, the receiver comprises two principle circuits, a receiver decoder shown in FIGS. 4A and 4B, and a receiver frequency synthesizer shown in FIG. 5.

Referring to FIG. 4A, the receiver decoder includes an analog receiver, 236, capable of receiving RF electromagnetic waves at an input, 237. The analog receiver 236 comprises an RF amplifier, 238, a mixer, 240, an IF filter, 242, an IF amplifier, 244 and an FM discriminator, 246.

Mixer 240 has two inputs, 248 and 250. Input 248 is connected to an output, 252, of the RF amplifier 238, while input 250 is connected to an output, 234, of a voltage controlled oscillator, 332, of the receiver frequency synthesizer shown in FIG. 5. As will be described later, the receiver frequency synthesizer of FIG. 5 generates carrier demodulating signals with a 10.7 MHz offset. Mixer 240 combines the generated offset carrier demodulating signals appearing at input 250 with an output signal appearing at output, 252, of the RF amplifier 238. An output, 254, from mixer 240 is connected to an input, 256, of IF filter 242, while an output, 258, from IF filter 256 is connected to an input, 260, of IF amplifier 244. The received signal obtained at an output, 262, of IF amplifier 244 comprises the 10.7 MHz offset frequency and either the 2.5 kHz acquisition signal or 4.0 kHz synchronization signal. FM discriminator 246 removes the 10.7 MHz offset frequency and provides, at an output, 264, thereof, the 2.5 kHz acquisition signal or the 4.0 kHz synchronization signal.

Mixer 240 continually combines the signal from output 248 of RF amplifier 238 with the five offset call carrier demodulating signals generated by the receiver frequency synthesizer shown in FIG. 5. The receiver frequency synthesizer generates the five offset call carrier demodulating signals sequentially, each with a duration of 4.0 ms. A clock signal that provides 4.0 ms timing pulses is provided as follows. A 4.0 MHz oscillator, 270, has an output, 272, connected to an input, 274, of a divider, 276, and an input, 278, of a call skipper, 280. Call skipper 280 comprises a divider having a divide ratio of ten with an output, 310, and a counter with an output, 281 that indicates when the counter has incremented to a value of ten. Divider 276 has a divide ratio equal to ten and therein reduces the 4.0 MHz square wave clock signal at input 274 to 400.0 kHz at an output, 282, thereof. The square wave signal obtained at output 282 serves as a clock signal to a divider, 284, at an input, 286, as well as a reference signal, 233, for the receiver frequency synthesizer of FIG. 5. Divider 284 has a divide ratio equal to five which further reduces the clock signal at input 286 thereof to 80.0 kHz at an output, 288, thereof. Output 288 connects to a divide by ten divider, 290, at an input, 292, which further reduces the clock signal to an 8.0 kHz square wave at an output, 294. Finally, output 294 is connected to an input, 296, of a divider, 298. Divider 298 has a divide ratio equal to 32 which reduces the clock signal to a 250 Hz square wave and therein subsequently provides a square wave signal at an output, 300. The square wave signal at output 300 provides a digital logic "1" every 4.0 ms.

With the clock signal at output 300 providing a "1" every 4.0 ms, call skipper 280, and a multiplexer, 302, shown in FIG. 4A, together with a shift register, 304, and a 10.7 MHz adder, 306, both shown in FIG. 4B, comprise receiver circuit components necessary to encode the five offset call carrier demodulating signals on data lines, 230A through 230J, also shown in FIG. 4B. Specifically, the clock signal at output 300 resets call skipper 280 at an input, 308, every 4.0 ms. With each reset pulse at input 308, an output, 281, thereof equals a value of "0" which, through an inverter, 283, enables call skipper 280 at an input, 289. Call skipper 280 then provides ten rapid pulses at an output, 310, to an input, 312, of multiplexer 302. After the tenth pulse, output 281 has a value of "1" which, through inverter 283, disables call skipper 280 at input 289. Multiplexer 302 is enabled at an input, 314, during generation of the five call carrier demodulating signals, and therefore multiplexer 302 selects the ten rapid pulses at input 312 which then appear at an output, 316. These two pulses appearing at output 316 in turn serve as a clock signal to shift register 304 at an input, 318, shown in FIG. 4B.

Like shift register 68 in the transmitter encoder of FIG. 2, shift register 304 of FIG. 4B provides digital values at outputs, 320B through 320H, that in combination represent in binary code 11 call and data carrier signals. Since each call carrier signal binary code provided by shift register 304 is followed by nine data carrier signal binary codes, the ten clock pulses received at input 318 of shift register 304 increment shift register 304 past the binary code sequence representative of the nine data carrier signals and thus to the next binary code representative of the next call carrier signal. As shown in FIG. 4B, an input, 319, of shift register 304 is connected to an output, 325, of an XOR gate, 323. Since XOR gate 323 and an inverter, 322, are connected to shift register outputs, 320B and 320H, to form the identical digital feedback network, as found in the transmitter encoder circuit of FIG. 2, the reader is referred to the above description of shift register 68 for detailed operation of the present shift register 304.

However, unlike the transmitter encoder shown in FIG. 2, the receiver decoder shown in FIG. 4B includes a 10.7 MHz adder 306. This 10.7 MHz adder 306 corresponds to the IF filter 242 and IF amplifier 244 found in the analog receiver input section 236. The 10.7 MHz adder 306 has inputs, 324B through 324H, that are connected to outputs 320B through 320H of shift register 304. The 10.7 adder 306 alters the binary code from shift register 304 such that 10.7 MHz is added to each carrier signal generated by the receiver frequency synthesizer shown in FIG. 5. Outputs from the 10.7 MHz adder 306 are data lines 230B through 230H. A rollover circuit, 326, provides outputs 230I and 230J. The rollover circuit 326 insures that all 50 carrier signal binary output codes on data lines 230A through 230J are generated in a circular loop and that no illegal binary codes are generated.

The receiver frequency synthesizer of FIG. 5 is substantially similar to the transmitter frequency synthesizer of FIG. 3. Like the transmitter frequency synthesizer of FIG. 3, the receiver synthesizer shown in FIG. 5 is a digital phase lock loop comprising a phase detector, 328, a loop filter, 330, a voltage controlled oscillator, 332, and a controllable divider generally shown at, 334. The controllable divider 334 further comprises the identical two-stage prescaler, 336, and programmable dividers or counters, 338 and 340, used in the transmitter frequency synthesizer of FIG. 3 and explained in operation above. The only differences between the transmitter frequency synthesizer of FIG. 3 and the receiver frequency synthesizer of FIG. 5 are those input/output signals necessary to operate with the receiver decoder circuit of FIGS. 4A and 4B. Specifically, these signals include fixing data line 230A at a "1", shown in FIG. 4B; connecting output 234, obtained at the voltage controlled oscillator 332, to input 250 of mixer 240, shown in FIG. 4A; and providing the synthesizer reference signal 233 for connection to a reference divider, 337. With all input/output signals defined, the reader is referred to the above description of the transmitter frequency synthesizer of FIG. 3 for operation of the receiver frequency synthesizer shown in FIG. 5.

With the receiver frequency synthesizer of FIG. 5 generating the five call carrier demodulating signals with a 10.7 MHz offset and durations of 4.0 ms, a receiver signal at output 264 of analog receiver 236 shown in FIG. 4A, contains either the 2.5 kHz acquisition signal or the 4.0 kHz synchronization signal. Receiver synchronization begins with recovery of the acquisition and synchronization signals.

As stated earlier, divider 276, shown in FIG. 4A, provides a clock signal with a frequency of 400.0 kHz at output 282. Besides providing a clock signal to input 286 of divider 284, output 282 is also connected to an input, 348, of a divider, 342, and an input, 350, of a timer, 352. Divider 342 has a divide ratio equal to 20 which reduces the clock signal at input 348 to a frequency of 20.0 kHz at an output, 354, thereof. Output 354 is connected to an input, 346, of a frequency detector, 340, comprising a counter and a one in ten decoder.

Detection of both the acquisition and synchronization signals is through frequency detector 340. The signal from output 264 of analog receiver 236, containing either the acquisition signal or the synchronization signal, is applied to an input, 356, of a latch, 358. On each positive going edge at input 356, latch 358 provides a "1" at an output, 360, thereof. Output 360 is connected to a reset input, 364, of frequency detector 340. Upon reset, frequency detector 340 provides a "1" at an output, 362, thereof which in turn resets latch 358 at an input, 367.

Frequency detector 340 includes two additional outputs, 366 and 368. Based on the time interval between pulses at input 364, as determined by counting the clock signals applied to input 346, frequency detector 340 provides a "1" at either output 366 or 368. If frequency detector 340 increments to eight, as determined by counting the clock signal pulses applied at input 346 thereof, before a successive pulse is applied to input 364, then the signal applied to input 356 of latch 358 is the 2.5 kHz acquisition signal and output 366 of frequency detector 340 thus has a value of "1". Likewise, if frequency detector 340 has only incremented to five before a successive pulse is applied to input 364, then the signal applied to input 356 of latch 358 is the 4.0 kHz synchronization signal in which case output 368 of frequency detector 340 will have a value of "1".

As stated earlier, each preamble time duration comprises modulating each call carrier signal by the 2.5 kHz acquisition signal for 55 cycles followed immediately by modulating the same call carrier signal by the 4.0 kHz synchronization signal for four cycles. The sequence of modulation is specific. Therefore, in order for the receiver decoder to confirm that the received signal at input 237 of analog receiver 236 is from a legitimate transmitter, the receiver decoder must first detect the acquisition signal, which in turn is followed by detection of the synchronization signal. In the preferred embodiment, a transmitter is recognized as a legitimate transmitter, if a locking sequence is detected. The locking sequence comprises detecting five successive cycles of the 2.5 kHz acquisition signal, followed within 25.0 ms by detection of three successive cycles of the 4.0 kHz synchronization signal.

Detection of the locking sequence is accomplished through frequency detector 340, described above, timer 352, a counter, 370, a counter, 372, and an AND gate, 374. Specifically, detection of the locking sequence occurs as follows. Output 366 of frequency detector 340 is connected to an enabling input, 376, of counter 370. When input 376 has a value of "1" indicating that successive pulses received at input 364 of frequency detector 340 are indicative of the 2.5 kHz acquisition signal, counter 370 is enabled. If counter 370 is enabled, these same pulses are counted by counter 370 at an input, 378, thereof. If counter 370 then increments to five, indicating five successive cycles of the 2.5 kHz acquisition signal, then an output, 380, thereof equals a "1". Output 380 is connected to a reset input, 382, of 25.0 ms timer 352, an enabling input, 384, of divider 284, and an input, 386, of AND gate 374. Consequently, if counter 370 increments to five, the 25.0 ms timer 352 is reset, divider 284 is disabled, and a "1" is applied to input 386 of AND gate 374.

With detection of five successive cycles of the 2.5 kHz acquisition signal, the locking sequence is complete if, within 25.0 ms, three successive cycles of the 4.0 kHz synchronization signal are detected. As stated above, output 368 of frequency detector 340 equals a "1" when successive clock pulses applied to input 364 are indicative of the 4.0 kHz synchronization signal. Output 368 is connected to an input, 390, of AND gate 374. Therefore, if the clock pulses at input 364 of frequency detector 340 are indicative of the 4.0 kHz synchronization signal, an output, 392, of AND gate 374 provides a "1" to an enabling input, 394, of counter 372. Like counter 370, counter 372, at an input, 393, also is connected to output 360 of latch 358 and therefore counts the occurrence of each pulse indicative of each cycle of the 4.0 kHz synchronization signal. When counter 372 has incremented to three, an output, 396, thereof has a value of "1". Output 396 is connected to an input, 398, of a 125.0 ms delay timer, 400. Delay timer 400 is added to substitute for the rising edge of the fourth cycle of the 4.0 kHz synchronization signal transmitted by the transmitter. An output, 402, of timer 400 is connected to a "Set" input, 404, of an RS flip-flop, 406. Thus, when output 402 of delay timer 400 equals a "1", RS flip-flop 406 is set which in turn provides a "1" at an output, 408, thereof indicating that the locking sequence is complete.

As stated earlier, the locking sequence comprises detection of three successive cycles of the 4.0 kHz synchronization signal within 25.0 ms of detecting five successive cycles of the 2.5 kHz acquisition signal. If three successive cycles are not detected within 25.0 ms, the receiver returns to generating the five offset call carrier demodulating signals. Specifically, the interconnections for this 25.0 ms reset circuit are as follows. An output, 410, of 25.0 ms timer 352 is connected to an input, 412, of an OR gate, 414. OR gate 414 has an output, 416, that is connected to an input, 418, of an OR gate, 420. OR gate 420 has an output, 422, connected to a reset input, 424, of counter 370, and a reset input, 426, of counter 372.

An output signal from output 410 of timer 352 initiates the 25.0 ms reset circuit. If the 25 ms timer 352 decrements to zero, a "1" is provided at output 410 which in turn propagates through OR gates 414 and 416 and in turn resets counters 370 and 372. With counter 370 reset, output 380 thereof equals a "0" which in turn resets timer 352 at input 382, and enables divider 284 at an input, 384. With divider 284 enabled, 4.0 ms clock pulses are again provided at output 300 thereof. The clock pulses initiate generation of the five offset call carrier demodulating signals via the receiver frequency synthesizer of FIG. 5.

Returning to the lock detection circuit described above, and assuming detection of both the acquisition and the synchronization signals, output 402 of delay timer 400 has a value equal to "1". This "1" resets dividers 284, 290 and 298 at reset inputs, 436, 438, and 440 thereof, respectively, provides a "1" at an input, 442, of OR gate 420, and sets RS flip-flop 406 through input 404 thereby providing a "1" at output 408 and a "0" at an output, 430. Output 430 is connected to a reset input, 432, of a divider, 434, and enabling input 314 of multiplexer 302. Therefore, when the locking sequence is complete, as signified by a value of "1" at output 402 and a value of "0" at output 430, multiplexer 302 is disabled, and dividers 284, 290, 298 and 434 are reset. Furthermore, since input 442 of OR gate 420 has a value of "1", counter 370 is reset at input 424 thereby enabling divider 284 through input 384 thereof. With divider 284 enabled, a 250 Hz clock signal with clock pulses every 4.0 ms again is provided by divider 298 at output 300.

Divider 298 provides a clock pulse every 4.0 ms to shift register 304, shown in FIG. 4B, in order to sequence through the binary code representative of the data carrier signals. The 4.0 ms clock pulses appearing at output 300 of divider 298 further serve as reset pulses to counters 370 and 372 at an input, 411, of OR gate 414, and a clock signal to divider 434, and multiplexer 302 at inputs, 439 and 444, thereof respectively. With multiplexer 302 disabled from a value of "0" appearing at output 430 of flip-flop 406, the 4.0 ms clock pulses propagate through multiplexer 302 to output 316 thereof, thereby providing a clock signal to a divider, 446, a divider with a divide ratio of 50, at an input, 448, and a clock signal to shift register 304, shown in FIG. 4B, at input 318 thereof. As stated earlier, shift register 304 provides binary output codes representative of all carrier signals. However, instead of incrementing shift register 304 through the binary carrier signal codes in increments of ten to provide binary codes, indicative of the five offset call carrier signals, shift register 304 is now incremented in steps of one to provide a sequence of binary data carrier signal codes identical to those produced by shift register 68 in the transmitter encoder circuit of FIG. 2.

Returning to the receiver decoder circuit of FIG. 4A and assuming operation of the receiver has progressed through generation of a single call carrier demodulating signal and nine data carrier signals, the demodulating signals every 4.0 ms. Initiation of this aspect occurs at divider 434. Divider 434 has a divide ratio of ten and an input signal 439 corresponding to the 4.0 ms clock signal from output 300 of divider 298. An output, 452, of divider 434 is connected to a "Reset" input, 454, of RS flip-flop 406. Thus when divider 434 has received ten 4.0 ms clock pulses at input 439, indicating that one call carrier demodulating signal and nine data carrier demodulating signals have been generated, flip-flop 406 is reset which provides a "0" at output 408 and a "1" at output 430. A "0" on output 430 resets divider 434 at input 432, and enables multiplexer 302 at input 314. With multiplexer 302 enabled, multiplexer 302 selects input 312 thereof which allows ten rapid clock pulses from output 310 of call skipper 280 to advance shift register 304, shown in FIG. 4B, beyond its current call carrier signal binary code to the next call carrier signal binary code. By rapidly advancing shift register 304 ten counts to the next call carrier signal binary code, the receiver continues scanning call carrier signals until it detects a new call from a different transmitter, or the second call from the original transmitter since each call carrier signal is modulated by the acquisition signal for 55 cycles. In either case, the lock sequence, as described above, will begin again.

Divider 446, shown in FIG. 4B, has a divide ratio of 50 and insures maximum signal reliability under multiple alternative transmission paths and fading conditions. Since each clock pulse sent to input 318 of shift register 304, shown in FIG. 4B, also is provided to input 448 of divider 446, shown in FIG. 4A, divider 446 counts the number of clock pulses sent to shift register 304. When 50 clock pulses have been received at input 448, an output, 450, of divider 446 has a value of "1". Output 450 is connected to a reset input, 451, of divider 446 and, as shown in FIG. 4B, is connected to a "Load" input, 452, of shift register 304. Therefore, when output 450 equals a "1", divider 446 is reset and shift register 304 is loaded with code, maintained at inputs, 454B through 454H, representative of the first call carrier signal.

One desirable use for the transmitter and receiver described above is in the implementation of a security system. Typically, such a system will have a number of locations in which transmitters will provide information, through signal transmissions having the format of message format diagram 10 of FIG. 1, to a central receiver, or receivers. FIG. 6 illustrates operation of such a system.

FIG. 6 shows four message format diagrams, 460, 462, 464, and 466, each having the format of message format diagram 10 shown in FIG. 1, and each representing a transmission from a different transmitter. Each of these message format diagrams comprises five preamble time durations, 468A through 468E (C1 through C5), in each of which a 2.5 kHz acquisition signal and a 4.0 kHz synchronization signal modulate is used by the transmitter to modulate a corresponding unique call carrier signal. Each of these message format diagrams also comprises five further information durations of time, 470A through 470E (D1 through D5), succeeding a corresponding one of the preamble time durations 468A through 468E. In each information durations 470A through 470E the transmitter uses a data signal to modulate a corresponding set of nine data carrier signals which differ from one another in frequency, and which differ in frequency from set to set.

The message format diagrams 460, 462, 464, and 466 are shown offset horizontally in FIG. 6 relative to each other to indicate that the corresponding transmitter transmits the transmission represented by its diagram by beginning at a different moment in time than each of the other transmitters involved. The offset in time between the start of transmission for two transmitters succeeding one another in this diagram is equal to one preamble time duration plus one information duration, an unlikely occurrence in practice but this case will show how the central receiver uses the call skipper described above to recover the corresponding data signals from each of the four transmitted.

A central receiver, cyclically generating demodulating signals at the five call carrier frequencies with a 10.7 MHz offset, there being a different one generated every 4.0 ms defining a scan period or scan time duration, may detect various call carrier signals in the transmissions represented by the message format diagrams 460, 462, 464 and 466. This will occur if the signals are represented by electromagnetic radiation of sufficient intensity at the receiver receiving antenna. Thus, for instance, the signals at that antenna cannot be too severely reduced through the cancellation that can arise from the interference which results because of the transmission of a transmitter following multiple paths. If detected, the transmissions will provide signals in the receiver which will be subsequently synchronized with a corresponding portion of the transmitter sequence of different frequency carrier signals, i.e. its carrier signal sequence. Such synchronization of the received carrier signal sequence permits the receiver to receive the data signal from each corresponding transmitter.

Using the transmissions represented by message format diagrams 460, 462, 464, and 466 of FIG. 6, synchronization of a central receiver with each corresponding portion of the transmitter carrier signal sequence of each transmission would occur as follows. Initially, the receiver is repeatedly generating every 4.0 ms scan period a demodulating signal on one of the unique five call carrier frequencies with a 10.7 MHz offset. These frequencies change cyclically for each successive signal. A first sequence of five receiver demodulator signals from the repeating succession thereof is shown occurring during a time period, 480, marked off in the upper left of FIG. 6. A vertical line showing the beginning of each such signal is numbered to indicate its carrier frequency and indicate the order of repetition of carrier frequencies. Preamble time duration 468A of message format 460 has, during its extent, a call carrier signal at the first call carrier frequency that is transmitted by its corresponding transmitter to form call carrier signal C1 which is modulated by the acquisition signal. Thus, the central receiver will not recover, through generating the first offset call carrier demodulating signal, the acquisition and synchronization signals of that transmitter represented by the first message format diagram 460 until a 4.0 ms time scan period, 482, occurring during, but at the end of, time period 480. The central receiver will synchronize with the carrier signal sequence provided by the transmitter associated with message format diagram 460 during that 4.0 ms time period 482, and will then remain synchronized to that carrier signal sequence during the succeeding information transfer time period, 484.

During time period 484, the central receiver will recover the data signal from that transmitter nine separate times through its having sequentially demodulated signals received from the transmitter with nine successive unique offset data carrier demodulating signals. After this activity, the central receiver implements the call skipper, described above, during a following time period, 486, which causes the central receiver to bypass generation of the second offset demodulating signal at the second call signal frequency ("second offset call carrier demodulating signal"), and thereafter begins cyclically generating the offset call carrier demodulating signals starting with the third offset call carrier demodulating signal.

Since, during time period 486, coinciding at least in part with preamble time duration 468B of message format diagram 460, the first transmitter is modulating the second call carrier signal C2 with the acquisition signal, the central receiver does not reach the corresponding offset call carrier demodulating signal to recover that acquisition signal transmitted by the transmitter associated with message format diagram 460 during its preamble time duration 468B. Rather, the central receiver continues cyclically generating offset call carrier demodulating signals with 4.0 ms scan time periods until it repeats generation of the first offset call carrier demodulating signal at a 4.0 ms scan time period, 488, coinciding with preamble time duration 468A of message format 462. At scan time period 488, the central receiver then recovers the acquisition signal present on the first call carrier signal C1 of the transmitted message represented by message format diagram 462. The central receiver then synchronizes with the carrier signal sequence provided by the transmitter associated with message format diagram 462 during a time period, 490, following time period 488, and receives the data signal from that transmitter nine separate times through its having sequentially demodulated signals received from the transmitter with nine successive unique offset data carrier demodulating signals. At the conclusion of time period 490, the central receiver again implements the call skipper, again advancing past generation of the second offset call carrier demodulating signal.

With the central receiver once again initially generating the third offset call carrier demodulating signal during a following time period, 500, coinciding at least in part with preamble time duration 468C of message format diagram 460, the central receiver recovers the acquisition signal carried by the third call carrier signal C3 transmitted by the transmitter associated with message format diagram 460. Subsequently, the central receiver becomes and remains synchronized with the carrier signal sequence of that transmission, including during a following time period, 502, and receives the corresponding data signal from that transmitter nine separate times through its having sequentially demodulated signals received from the transmitter with nine successive unique offset data carrier demodulating signals. At the conclusion of time period 502, the central receiver skips past generation of the fourth offset call carrier demodulating signal and begins again cyclically generating such signals with the fifth offset call carrier demodulating signal. Since none of the transmissions represented by message format diagrams 460, 462, 464 and 466, during a following time period, 504, coinciding at least in part with preamble time duration 468D of message format diagram 460, are currently transmitting the fifth call carrier signal C5, the central receiver, after one 4.0 ms scan time period, begins again generating the first offset call carrier demodulating signal. The central receiver now recovers the acquisition signal carried by the first call carrier signal C1 transmitted by the transmitter associated with message format diagram 466 during a time period, 506, overlapping time period 504 and coinciding at least in part with preamble time duration 468A of message format diagram 466. The receiver becomes and remains synchronized to the carrier signal sequence of that transmitter during a following time period, 508. The central receiver then skips generation of the second offset call carrier demodulating signal and begins again generating offset call carrier demodulating signals with the third offset call carrier demodulating signal during a subsequent time period, 510, coinciding at least in part with preamble time duration 468C of message format diagram 464.

With the central receiver once again generating the third offset call carrier demodulating signal during time period 510, the central receiver recovers the acquisition signal present on the third call carrier signal C3 transmitted by the transmitter associated with message format diagram 464. Subsequently, the central receiver synchronizes with the carrier signal sequence of that transmitter during a following time period, 512, and receives the corresponding data signal from that transmitter nine separate times through its having sequentially demodulated signals from the transmitter with nine successive unique offset data carrier demodulating signals.

At the conclusion of time period 512, the central receiver has synchronized with portions of the carrier signal sequences of all four transmitters represented by message format diagrams 460, 462, 464 and 466 at least once. Specifically, the central receiver has synchronized with the carrier signal sequence transmitted by the transmitter associated with message format diagram 460 twice, and the carrier signal sequence of all other transmitters represented by message format diagrams 462, 464, and 466 once. With each time period of carrier signal sequence synchronization comprising demodulation of the received signal with nine successive unique data carrier demodulating signals, the data signal transmitted from the transmitter associated with message format diagram 460 has been recovered eighteen times while the data signal transmitted from the transmitters associated with all other message format diagrams 462, 464, and 466 has been recovered nine times. All time periods of carrier signal synchronization after time period 512, to be described below, allow the central receiver to recover and verify the accuracy of data signals already recovered.

At the conclusion of time period 512, the central receiver again implements the call skipper and begins generating offset call carrier demodulating signals starting with the fifth offset call carrier demodulating frequency. Since the second transmitter is now modulating the fifth call carrier signal C5 by the acquisition signal during a time period, 514, coinciding at least in part with preamble time duration 468E of message format diagram 462, the central receiver recovers the acquisition signal and synchronization signal carried by the fifth call carrier signal C5. This in turn leads to synchronization of the central receiver to the carrier signal sequence of that transmission during a following time period, 516, and subsequent recovery of the data signal from that transmitter through having sequentially demodulated signals received from that transmitter with nine successive unique offset data carrier demodulating signals.

After recovering the corresponding data signal from the transmitter represented by message format diagram 462 during time period 516, the central receiver executes the call skipper and begins cyclically generating offset call carrier demodulating signals, starting with the second offset call carrier demodulating signal, during a following time period, 518, coinciding at least in part with preamble time duration 468D of message format diagram 466. Upon generation of the fourth offset call carrier demodulating signal, the central receiver, during a time period, 520, that overlaps time period 516 and also coincides at least in part with preamble time duration 468D of message format diagram 466, recovers the acquisition and synchronization signals carried by the fourth offset call carrier signal transmitted from that transmitter associated with message format diagram 466. Subsequently, the central receiver becomes and remains synchronized with the carrier signal sequence of that transmitter during a following time period, 522, and receives the corresponding data signal from that transmitter nine separate times through its having sequentially demodulated signals from the transmitter with nine successive unique offset data carrier demodulating signals.

As shown in FIG. 6, at the conclusion of time period 522 only the fourth transmitter, represented by message format diagram 466, remains transmitting. Subsequently, when the central receiver begins cyclically generating offset call carrier demodulating signals starting with the first offset call carrier demodulating signal during a following time period, 526, coinciding at least in part with preamble time duration 468E of message format diagram 466. The central receiver does not receive any acquisition signal until it generates the fifth offset call carrier demodulating signal during a time period, 528, coinciding at least in part with preamble time duration 468E of message format diagram 466. The central receiver then recovers the acquisition signal carried by the fifth call carrier signal C5 and becomes and remains synchronized with the carrier signal sequence of that corresponding transmitter during a following time period, 530. At the conclusion of period 530, the central receiver again implements the call skipper advancing past generation of the first offset call carrier demodulating signal. Since all transmitters represented by message format diagrams 460, 462, 464, and 466 are no longer transmitting, the central receiver cyclically generates the demodulating signals at the five offset call frequencies, one demodulating signal during each 4.0 ms scan period, until detection of another transmitted call carrier signal from another initiated transmitter.

As shown in FIG. 6, a system that incorporates a number of transmitters may have two or more of these transmitters initiated at moments in time that cause the transmitters to transmit simultaneously during the same time durations. Although such simultaneous transmissions will prevent a receiver from synchronizing to the complete carrier signal sequence of all the initiated transmitters, the receiver implementing the call carrier signal skipping described above will, in general, synchronize with at least a portion of each respective carrier signal sequence from all of the transmitters at least once and recover therefrom the corresponding data signal.

Referring to FIGS. 7 and 8, two situations do, however, exist where simultaneous transmissions will cause either inaccurate data signal recovery by the central receiver or synchronization of the central receiver with only one of a plurality of initiated transmitters. The first situation, shown in FIG. 7, occurs when two transmitters, one represented by message format diagram, 530, and a second represented by message format diagram, 532, begin transmitting at substantially a same moment in time, 534. Both message format diagrams 532 and 534 comprise five preamble time durations, 531A through 531E, (C1 through C5), wherein each preamble time duration 531A through 531E is succeeded by a corresponding information time duration, 535A through 535E (D1 through D5). Since both transmitters use the same carrier signal sequence throughout all preamble time durations 531A through 531E, and all information time durations 535A through 535E, interference will exist between these transmitted carrier signals. Due to this carrier signal interference, the central receiver may not be able to recover the transmitted acquisition and synchronization signals carried by the call carrier signals during preamble time durations 531A through 531E. However, even if the acquisition and synchronization signals are recovered, the central receiver has in effect synchronized with both transmitters. Therefore, any data signal that is recovered by the central receiver could be a combination of data signals from both of the transmitters, but most typically the receiver will capture and "lock on" to the one of the two signals received having the greater signal amplitude. By delaying the initiation of one of the transmitters, for example the second transmitter represented by message format diagram 532, to at least a point in time coinciding with generation of the second call carrier signal during preamble time duration 531B of message format diagram 530, the central receiver would then be able to synchronize with portions of each transmitter respective carrier signal sequence and recover the corresponding data signal therefrom.

The second situation, in which a data signal from a transmitter is not recovered by a central receiver, is shown in FIG. 8. In this situation, a first transmitter, represented by message format diagram, 540, having five preamble time durations, 541A through 541E (C1 through C5), and five succeeding information time durations, 543A through 543E (D1 through D5), begins transmitting at a moment in time, 542. As described above, a central receiver, cyclically generating offset call carrier demodulating signals, will recover the acquisition and synchronization signals carried by the first call carrier signal during preamble time duration 541A. Subsequently, during a time period, 544, that coincides with at least part of preamble time duration 541A and information time duration 543A, the central receiver will then synchronize with that portion of the carrier signal sequence transmitted from the transmitter associated with message format diagram 540.

Meanwhile, during time period 544, a second transmitter represented by message format diagram, 546, is initiated and begins transmitting. Message format diagram 546 also comprises five preamble time durations 545A through 545E (C1 through C5), and five information time durations, 547A through 547E (D1 through D5) and like the first transmitter, the second transmitter modulates the first call carrier signal by the acquisition signal during its first preamble time durations 545A. However as shown in FIG. 8, preamble time duration 545A fully coincides with a portion of information time duration 543A of message format diagram 540. Therefore, the central receiver, having already synchronized to the carrier signal sequence of message format diagram 540 during time period 544, is unable to recover the acquisition signal carried by the first call carrier signal during preamble time duration 545A.

At the conclusion of time period 544, the central receiver once again begins cyclically generating offset call carrier demodulating signals during a time period, 550, that coincides at least in part with preamble time duration 541B of message format diagram 540. Since synchronization of the central receiver to a transmitted carrier signal sequence occurs only after recovery of the acquisition and synchronization signals, the central receiver does not respond to the data carrier signals transmitted from the second transmitter during information time duration 547A, and therefore will not synchronize with its carrier signal sequence. The central receiver, on the other hand, will recover the acquisition and synchronization signals transmitted during preamble time duration 541B of message format diagram 540, and thus will again synchronize with the carrier signal sequence of the first transmitter during a time period, 554, that coincides at least in part with preamble time duration 541B and information time duration 543B. As shown in FIG. 8, all preamble time durations 545A through 545E of message format diagram 546 fully coincide with corresponding portions of information time durations 543A through 543E, which thus prevents the central receiver from ever synchronizing with the carrier signal sequence transmitted by the transmitter represented by message format diagram 546. As in the first situation shown in FIG. 7, if initiation of the second transmitter represented by message format diagram 546 is delayed until at least a point in time coinciding with generation of the second call carrier signal 541B, then the central receiver will alternately synchronize with portions of carrier sequences from each transmitter.

In practice, the aforementioned situations described above and diagrammed in FIGS. 7 and 8 will rarely occur because sensors that initiate the transmitters have inherent time delays. These time delays are typically of varying durations and therefore are sufficient to offset the transmitted messages such that the central receiver can synchronize portions of each transmitted carrier sequence signal. If simultaneous transmission like those shown in FIGS. 7 and 8 still persist, then a fixed time delay can be included in any one of the simultaneously transmitting transmitters. The fixed time delay can be from any timer circuit, such as an RC network, that has a repeatable time delay.

In conclusion, the present invention provides a frequency hopping communication system capable of use in security systems. The transmitter circuit described above initiates communication to the central receiver only upon the occurrence of an initiating event. Since electrical power is consumed primarily only during transmission, the transmitter can operate on battery power thereby allowing such transmitters to be placed and used in facilities where line power is absent.

Although the present invention has been described with reference to the preferred embodiment, workers skilled in the art will recognize that changes may be made in form and detail without departing from the spirit and scope of the invention.

What is claimed is:

1. A communications system for transmitting to at least one receiving location selected information at selected times from at least one of a plurality of different transmitting location remote from said receiving location, said system comprising:

a plurality of transmitter means each located at a corresponding one of said transmitting locations and each being capable of transmitting electromagnetic radiation in any of a succession large time units (12) initiated by a corresponding initiating event; with that electromagnetic radiation transmitted in each said large time unit in said succession thereof having frequencies of said electromagnetic radiation in a selected bandwidth about a corresponding one of a plurality of available carrier frequencies, said plurality of transmitter means each being capable of modulating a carrier signal transmitted thereby to result in said electromagnetic radiation being transmitted during those corresponding said large time units in said succession thereof (10) such that: said succession has a plurality of preamble time durations (12A . . . 20A) provided therein separated from a succeeding one of said preambles by a corresponding information time durations (26A . . . I) in a multiplicity of said pluralities of information time durations (12B) which preamble and separating plurality of information time durations comprise one said large time unit (12);

each of said carrier signals which occur during a corresponding preamble time duration are of a different frequency value in said plurality thereof from those of said carrier signals occurring in each other said preamble time duration in said succession of time durations;

said succession of time durations; and each said carrier signal is modulated by an acquisition signal, such carrier signal occurring during a corresponding said information time duration being modulated by a selected data signal after modulation of said corresponding preamble; and a receiver means located at said receiving location and being capable of receiving said electromagnetic radiation substantially reaching it which has been transmitted means, said receiver means being;

capable of determining, during each of a succession of scan time durations (1, 2, 3, 4, 5;) shorter in tim than said preamble time duration, whether any received electromagnetic radiation detectable by said receiver means is at least a portion of one of said preamble time duration signals:

capable of recovering, through demodulating that received signal with differing ones of a plurality of demodulating signals each having a frequency based on a corresponding one of said carrier frequencies until electromagnetic radiation transmitted from one of said transmitter means detects an initial acquisition preamble time duration signal:

thereafter continuing to detect electromagnetic radiation from said one of said transmitter means and demodulating said receiving signal with said demodulating signals during such time as remains in said initial acquisition preamble time duration signal and with recovered signals occurring: and then during that plurality of information time durations immediately following, receiving each recovered information time duration signal having a carrier frequency being demodulated based on a corresponding one of said plurality of carrier frequencies to recover data from said plurality of information time duration signals.

2. The apparatus of claim 1 wherein said modulation by said acquisition signal in each said preamble time duration in a said succession of time durations is followed in that said preamble time duration by modulation with a synchronization signal.

3. The apparatus of claim 2 wherein said synchronization signal is a two value digital signal, and said modulating thereby is by frequency shift keying.

4. The apparatus of claim 3 wherein said synchronization signal alternates between two said values at a synchronization oscillation frequency which has a value that is small relative to values of any of said plurality of carrier signals.

5. The apparatus of claim 1 wherein said acquisition signal is a two value digital signal, and said modulation thereby is by frequency shift keying.

6. The apparatus of claim 5 wherein said acquisition signal alternates between two said values at an acquisition oscillation frequency which has a value that is small relative to values of any of said plurality of carrier signals.

7. The apparatus of claim 1 wherein each of said plurality of information time durations in said multiplicity thereof in a said succession of time durations comprise at least three successive said time durations.

8. The apparatus of claim 7 wherein said data signal is selected from a plurality of two value digital signals, and said modulating thereby is by frequency shift keying.

9. The apparatus of claim 7 wherein a selected data signal modulates said carrier signal in a said transmitter means from said plurality of transmitter means during each said information time duration in a said succession of time durations of that said transmitter means.

10. The apparatus of claim 8 wherein said modulation by said acquisition signal in each said preamble time duration in a said succession f time durations is followed therein by modulation with a synchronization signal with said synchronization signal being a two value digital signal that alternates between two said values at a synchronization oscillation frequency which has a value that is small relative to values of any of said plurality of carrier signals.

11. The apparatus of claim 10 wherein said data signals have a maximum state changing frequency that is substantially equal to said synchronization oscillation frequency.

12. The apparatus of claim 1 wherein at least some of said transmitting locations are locations where a selected sensor for sensing a selected condition is provided, and said initiating event for a said transmitting means at such a said transmitting location is an indication in a signal from its corresponding said sensor at that location that said condition to be sensed thereby has occurred.

13. A communication system as set forth in claim 1 wherein said available carrier frequencies are sampled in a set order by said receiver means during each succession of scan time durations, said order being the same order employed by said transmitter means such that after recovery of data following each one of said preamble time duration that is demodulated by said receiver means, said order being modified by skipping the next to occur carrier frequency in said order from that used for said one of said preamble time durations.

14. A method for transmitting to at least one receiving location selected information from at least one of a plurality of different transmitters remote from said receiving location each transmitter capable of transmitting electromagnetic radiation in any of a succession of large time durations, said transmission being initiated by a corresponding initiating event, with that electromagnetic radiation transmitted in each said large time duration in a said succession thereof having frequencies therein in a selected bandwidth about a corresponding one of a plurality of available carrier frequencies each differing from that carrier frequency in said plurality thereof from that carrier frequency used in other said large time durations in said succession thereof; said plurality of transmitters each being capable of modulating a carrier signal transmitted thereby to result in transmitting said electromagnetic radiation during those corresponding said large time durations in said succession thereof so that there is a plurality of preamble time durations in said large time durations each separated from its succeeding preamble by a corresponding plurality of information time durations, said carrier signal occurring during a corresponding said preamble time duration being modulated by an acquisition signal and a said carrier signal occurring during a corresponding said information time duration being modulated by a data signal, said method comprising:

scanning through those of said plurality of carrier frequencies used in said preamble time durations, in each of a succession of scan time durations shorter than said preamble time duration, using a receiver means located at said receiving location to determine whether any received electromagnetic radiation detectable as received signals by said receiver means has been transmitted by one of said plurality of transmitter means through determining whether any of said received signals is one from which at least a portion of said acquisition signal can be recovered through demodulating that said received signal with one of a plurality of demodulating signals each having a frequency based on a corresponding one of said carrier frequencies available for use during any of said preamble time durations;

sensing occurrence of a said initiating event by an initial one of said plurality of transmitting means;

transmitting electromagnetic radiation from said initial transmitting means in an initial large time duration after said initiating event;

detecting in said receiver means electromagnetic radiation transmitted from said initial transmitter means during one of said scan time durations and demodulating a received signal obtained therefrom using a corresponding one of said plurality of demodulating signals to recover at least part of said acquisition signal during said acquisition preamble time duration; and detecting in said receiver means electromagnetic radiation transmitted from said initial transmitter means, and demodulating said received signal obtained therefrom during that plurality of information time durations in said initial large time duration immediately following that acquisition preamble time durations using recovery signals each having a frequency based on a corresponding one of said plurality of available carrier frequencies occurring in said information time durations to recover said data signal during said information time durations.

15. The method of claim 14 wherein said demodulating of a received signal using a corresponding one of said plurality of carrier signals occurring in said preamble time durations to recover at least part of said acquisition signal during said acquisition preamble time duration also recovers thereafter a synchronization signal during said acquisition preamble time duration.

16. The method of claim 15 wherein said synchronization signal is a two value digital signal and said data signal is selected from a plurality of two value digital signals, said modulating by each being by frequency shift keying, said synchronization signal alternating between two said values at a synchronization oscillation frequency which has a value that is small relative to values of any of said plurality of carrier signals and said data signals have a maximum state changing frequency that is substantially equal to said synchronization oscillation frequency.

17. A communication system as set forth in claim 14 wherein said transmitter apply carrier frequencies from said a available carrier frequencies in an order from one initiating event to the next to occur initiation for each said transmitter.

18. A method as set forth in claim 17 wherein said receiver means applies the same series order in each said succession of scan times until a transmitted preamble signal is received by said receiver means and then, after the data following said preamble is received, the next carrier frequency in said series order is skipped for the next succession of scan times.

19. A communication system for transmission from at least one transmitter to at least one receiver wherein;

each transmitter in said system broadcasts signals in a spread spectrum manner as follows:

on the occurrence of an initiating event to said transmitter, broadcasting will occur over a series of large time units, in succession, for each initiating event, said broadcast occurring in a selected bandwidth about a selected carrier frequency for at least one portion of each large time unit in said succession of large time units which carrier frequency is selected substantially uniquely over a range of available carrier frequencies for each said large time unit in said succession.

20. A communication system as set forth in claim 19 wherein broadcast signals in each said large time duration occur in either a preamble time duration or information time duration, said preamble time duration occurring at the start of said large time duration.

21. A communication system as set forth in claim 20 wherein each said receiver can receive signals broadcast by each of said transmitters, wherein said receiver captures a signal by scanning said range of available carrier frequencies in scan times shorter than said preamble time durations.

22. A communication system as set forth in claim 21 wherein the range of carrier frequencies is scanned in only one of either a noncontinuous or a continuous sequential order until the next scan time following a captured broadcasted large time unit, and during said next scan times the sequential order applied is shifted so as to skip the next frequency in the sequential order.

* * * * *